Figure 4:
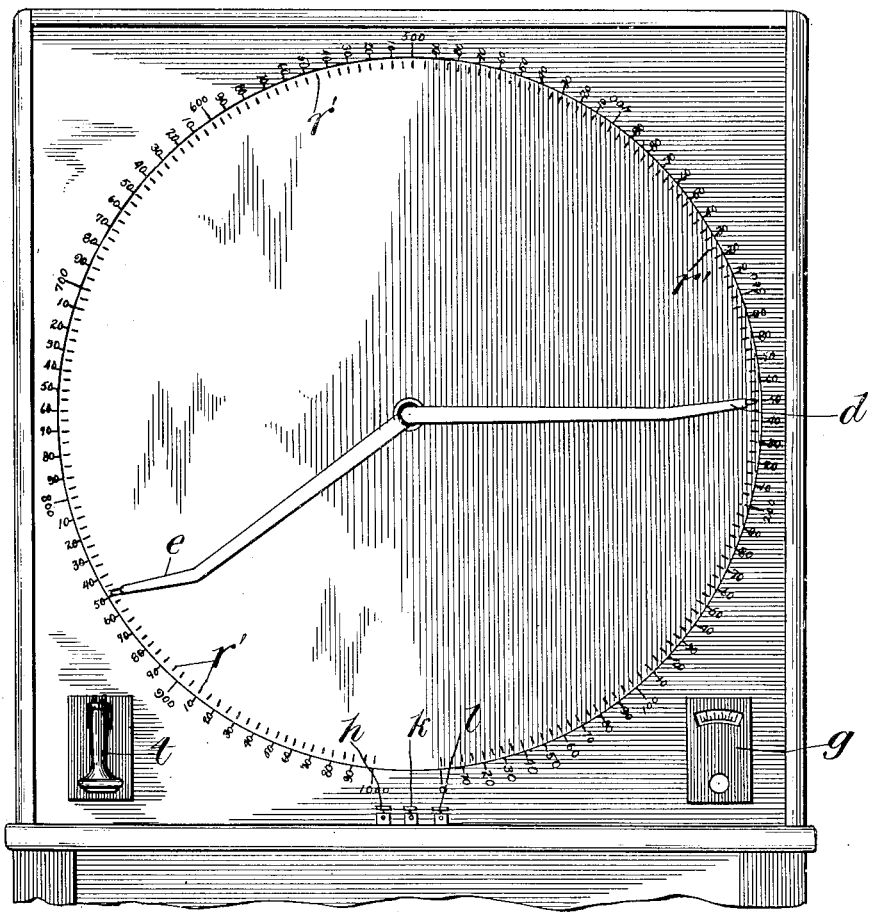

No. 754,402. PATENTED MAR. 8, 1904.
D. E. WISEMAN.
FAULT LOCATOR FOR ELECTRIC CABLES.
APPLICATION FILED AUG. 3, 1903.
NO MODEL. 2 SHEETS—SHEET 1.
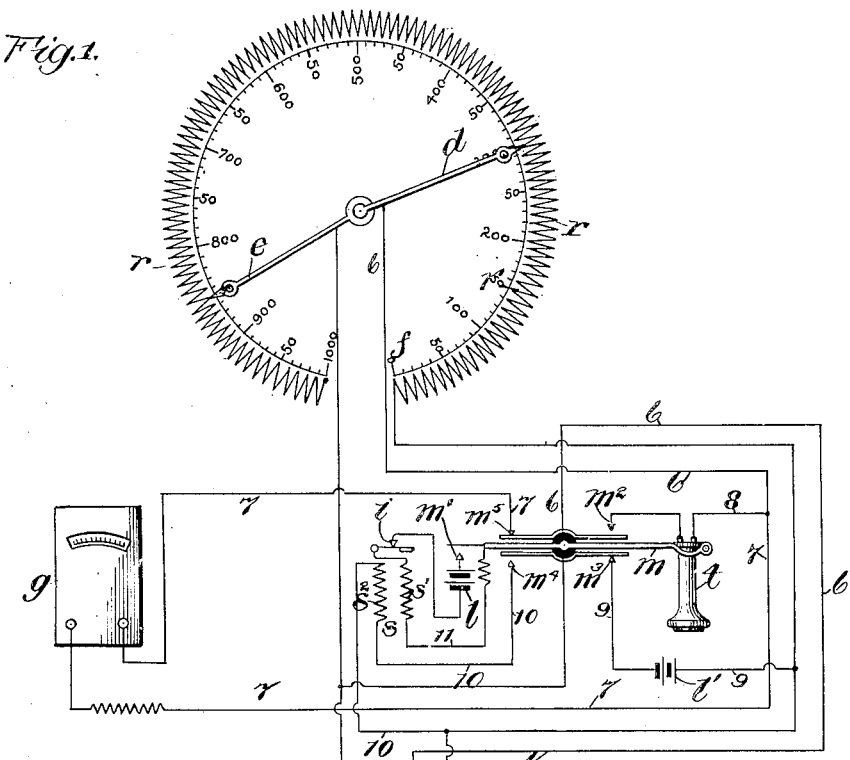
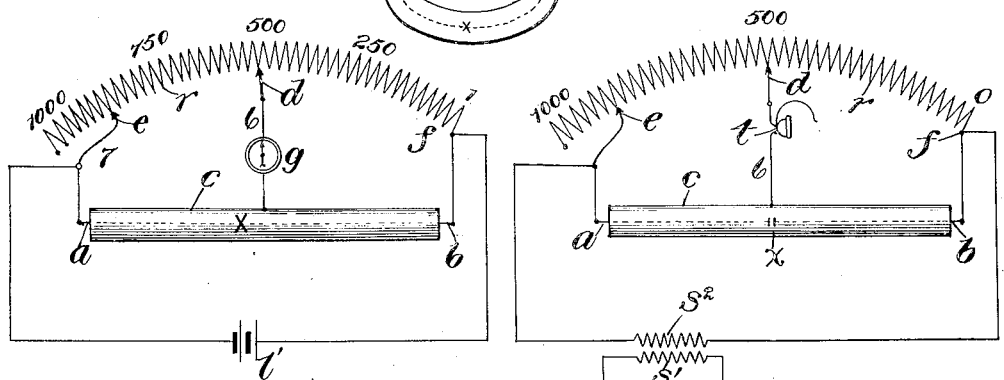
Witnesses:
C. M. Kermich
W. H. Leach
Inventor:
Daniel E. Wiseman
By Barton & Tanner
Attorneys.

No. 754,402. PATENTED MAR. 8, 1904.
D. E. WISEMAN.
FAULT LOCATOR FOR ELECTRIC CABLES.
APPLICATION FILED AUG. 3, 1903.
NO MODEL. 2 SHEETS—SHEET 2.

No. 754,402.  
Patented March 8, 1904.

UNITED STATES PATENT OFFICE.

DANIEL E. WISEMAN, OF SPOKANE, WASHINGTON.

FAULT-LOCATOR FOR ELECTRIC CABLES.

SPECIFICATION forming part of Letters Patent No. 754,402, dated March 8, 1904.

Application filed August 3, 1903. Serial No. 167,963. (No model.)

*To all whom it may concern:*

Be it known that I, DANIEL E. WISEMAN, a citizen of the United States, residing at Spokane, in the county of Spokane and State of Washington, have invented a certain new and useful Improvement in Fault-Locators for Electric Cables, of which the following is a full, clear, concise, and exact description.

My invention relates to cable-testing apparatus; and its object is to provide improved means for quickly locating "faults," such as crosses, grounds, or breaks in the cable-conductors.

More particularly my object is to avoid the necessity of calculation on the part of the operator, and I have invented an apparatus by means of which the distance from the end of the cable to the fault may be read directly upon a scale in units of distance.

Generally speaking, my invention contemplates the use of a resistance arranged to be divided into two branches or ratio-arms of a Wheatstone-bridge circuit by a movable contact, the faulty conductor being connected with said resistance, so that the portions of said conductor on either side of the fault are included, respectively, in the other two arms of said Wheatstone-bridge circuit. The testing instrument is included in the bridge in the usual way, and a suitably-connected source of testing-current is provided. In this arrangement when a balance is obtained such that no current flows through the bridge containing the testing instrument it will be apparent that the proportions of the resistance in the respective ratio-arms will correspond with the portions of cable-conductor on either side of the fault, so that the location of the fault can be determined with considerable accuracy. In accordance with my invention I divide the total resistance of the two ratio-arms of the Wheatstone bridge into a number of arbitrary units corresponding to the number of units of distance—it may be feet, or yards, or miles—in the length of cable being tested. When the movable contact-terminal which divides the total operative resistance into two ratio-arms is moved to such a point on the resistance that a balance is obtained in the bridge containing the testing instrument, it will be apparent that the number of units of resistance in the respective ratio-arms will then indicate directly the number of units of distance from the ends of the cable to the fault. I preferably provide a resistance divided into a number of equal parts—say one thousand—with a correspondingly-divided scale and a contact-terminal which is adapted to be set at any point along said resistance until the number of units of resistance brought into circuit, as shown by the scale, corresponds to the number of units of length in the conductor being tested. The other movable contact, which determines the relative distribution of this operative resistance in the two ratio-arms, may then be adjusted until a balance is obtained, and the position of this second-mentioned contact on the scale will then indicate in units of length the distance from the end of the cable to the fault.

I will describe my invention by reference to the accompanying drawings, in which—

Figure 5:
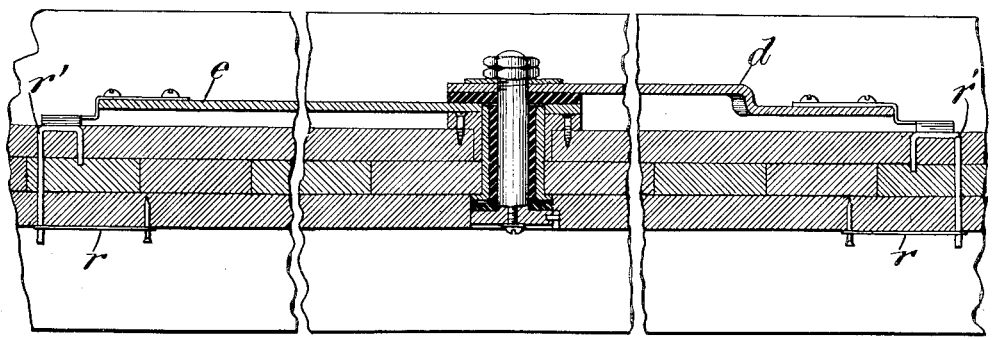

Figure 1 is a diagram illustrating the apparatus adapted for use in testing for either breaks or crosses in the cable-conductors. Fig. 2 is a simplified diagram illustrating the use of the apparatus in locating a cross. Fig. 3 is a similar simplified diagram showing the use of the apparatus in locating a break. Fig. 4 is a view in elevation of a rheostat having two movable contact-arms moving over the uniformly-divided resistance and the scale indicating the divisions of said resistance, and Fig. 5 is a detail sectional view showing the construction of the rheostat.

The same characters of reference are used to designate the same parts wherever they are shown.

By reference to Figs. 2 and 3 the circuits for making the test will be easily understood. The resistance $r$, which is divided uniformly into a number of arbitrary units, is connected with the ends of the faulty conductor $a\,b$ and with the terminals of a source of current in such a way that the resistance and said conductor $a\,b$ are in parallel branches of the circuit. The testing instrument, which may be a galvanometer $g$ in testing for crosses or a telephone $t$ in testing for breaks, is connected in a bridge-conductor 6, one terminal of which is connected to the sheath of the cable or the bunch of other wires, while the other terminal is connected to a movable contact $d$, which is adapted to be adjusted to any point along the uniformly-divided resistance $r$. The operative length of the resistance $r$, which is included in the two ratio-arms of the Wheatstone-bridge circuit, is determined by the position of a movable contact $e$, which forms the terminal of a conductor 7, leading from the end $a$ of the conductor $a\,b$. The other end $b$ of said conductor is connected to the end $f$ of the resistance.

In Fig. 2 a cross of the conductor $a\,b$ with the sheath $c$ of the cable is indicated at $x$, and in Fig. 3 $x$ indicates a break in the conductor $a\,b$. In the arrangement of Fig. 2 when the contact $d$ is at such a position along the resistance $r$ that a balance is obtained and no current flows through the bridge 6 it is evident that the number of units of resistance between $d$ and $f$ will bear the same ratio to the total number of units of resistance as the length of conductor $b\,x$ bears to the total length $a\,b$. If, therefore, the contact $e$ has been located at such a point on the resistance $r$ that the number of units of resistance in the branch $e\,f$ is the same as the number of units of length—it may be feet, yards, or miles—in the conductor $a\,b$, then the number of units of resistance in the portion $d\,f$ will be the same as the number of units of length in the portion of conductor $a\,b$ from the end $b$ to the cross $x$. The location of the fault may therefore be read directly from the location of the movable contact $d$ upon the scale, which indicates the number of arbitrary units of resistance included in the ratio-arm $d\,f$. Fig. 3 shows a similar arrangement for determining the location of a break in conductor $a\,b$. In this case the current is derived from the secondary $s^2$ of an induction-coil, the primary $s'$ whereof is in circuit with a battery $l$ and interrupter $i$. The testing instrument in the bridge-conductor 6 in this case is a telephone. In making the test the contact $e$ is first set at such a point that the number of arbitrary units in the operative portion $e\,f$ of the resistance $r$ will correspond with the number of units of length in the conductor $a\,b$. The movable contact $d$ is then shifted along the resistance $r$ until it reaches a point where no sound is heard in the telephone $t$. The ratio of the resistance $d\,f$ to the resistance $e\,d$ corresponds to the ratio of capacity $a\,x$ to capacity $b\,x$.

In Figs. 4 and 5 I have shown a rheostat having two movable contact-arms $d\,e$, which are pivoted to move over a scale divided into one thousand parts. These arms are insulated from each other at their common pivot, as shown, and the contact-shoes upon their outer ends bear upon the contact-terminals $r'\,r'$ of a resistance $r$, which may be wound upon suitable pegs at the back of the rheostat-frame. The total resistance $r$ is divided into one thousand equal parts by the contact-terminals $r'$, corresponding to the one thousand points on the scale. The circuits and apparatus used with this rheostat are shown in Fig. 1. The testing instrument to be used may be either a galvanometer $g$ or a telephone $t$, and I have illustrated a telephone switch-hook adapted to bring these instruments alternatively into circuit. When the telephone is on its hook, the galvanometer $g$ is included in the bridge, and when the telephone is taken from its hook said galvanometer is disconnected and the telephone-receiver substituted therefor. Three binding-posts $h\,k\,l$ are provided for connecting the testing instruments with the cable. The binding-posts $h$ and $l$ are to be connected with the ends of the faulty conductor of the cable, while the post $k$ should be connected to the sheath and to the bunch of other conductors. The binding-post $l$ is connected with one end $f$ of the resistance $r$, the extreme end of said resistance being open, and the binding-post $h$ is connected with the movable contact-arm $e$, which thus determines the operative portion of resistance $r$, which is connected with the terminals of the faulty conductor. The other movable contact-arm $d$ of the rheostat forms the terminal of a bridge-circuit 6, extending to the binding-posts $k$ and divided into two parallel branches 7 8, which are adapted to be alternatively closed by the telephone-switch $m$, the branch 7, containing the galvanometer, being normally closed when the telephone is on its hook. When the telephone-receiver is taken from its hook, the branch 7 is opened at contact $m^5$ and the branch 8 closed at contact $m^2$. The telephone-switch $m$ also controls the application of two different sources of testing-current. When the telephone is on its hook, the test-battery $l'$ is connected in a circuit 9 between the binding-posts $h$ and $l$, the continuity of this circuit being controlled by the contact $m^3$; but when the telephone is taken from its hook the contact $m^3$ is broken and another circuit 10 between said binding-posts $h\,l$ established at the contact $m^4$, said circuit including the secondary $s^2$ of an induction-coil $s$. The primary $s'$ of said induction-coil is in a local circuit 11 with a battery $l$ and interrupter $i$, said local circuit being also closed at a contact $m'$ when the telephone is taken from the hook.

The operation of testing a cable with this apparatus is extremely simple. Assuming the fault to be a cross or ground, the inside end of the cable is connected to the binding-post $h$ and the outside end to the binding-post $l$. The sheath and the bunch of other conductors are connected together to the middle binding-post $k$. The length of the cable being known, the contact-arm $e$ is then adjusted to such a position on the scale that the number of units of resistance included in the operative length $e\,f$ will correspond with the number of units of length in the cable—that is to say, assuming the cable to be eight hundred and fifty feet long, the arm $e$ would be set at the figures "850." The fault in this case being a cross or ground the test will be made with the galvanometer, so that the telephone being on its hook the arm $d$ will simply be moved along the scale until the galvanometer shows no deflection. A balance being thus obtained the distance of the cross from the outside end of the cable is then indicated by the figures on the scale where the contact-arm $d$ rests. In Fig. 5 the contact-arm $e$ is shown resting on the point "850" of the scale, while the contact-arm $d$ rests on the point "250." If a balance were obtained under these conditions, it would therefore mean that the cross was located two hundred and fifty feet from the outside end of the cable. In testing for breaks the connection of the cable with binding-posts $h$ and $l$ is reversed—that is, the outside end is connected to binding-post $h$ and the inside end to binding-post $l$. The contact-arm $e$ being adjusted, as before, to indicate on the scale the length of the cable, the telephone $t$ is taken from the hook, and the operator while listening in the telephone moves the contact-arm $d$ until the minimum sound of the alternating current from the induction-coil winding $s^2$ is heard. The figures on the scale where the contact-arm $d$ rests will indicate, as before, the distance in feet from the outside end of the cable to the break.

The advantages of this testing apparatus will be easily apparent. No mathematical calculations are necessary to determine the location of the break. It is read directly on the scale. Only one reading is necessary, and this may be taken by an ordinary unskilled person. In order to locate a fault with accuracy by any method, the several parts should be tested under exactly the same electrical conditions, and with my apparatus such a test is made, because the defective parts are balanced against each other at the same moment. Trouble caused by jarring the galvanometer in locating breaks by the old method is done away with, and because of the accuracy and rapidity of operation of my instrument much time is saved in repairing faulty cables.

Having thus described my invention, I claim—

1. In a fault-locator for electric cables, the combination with a resistance and a movable contact adapted to divide the same into two branches, of means for connecting said branches to form two ratio-arms of a Wheatstone-bridge circuit, the faulty conductor of the cable being connected so that the portions on either side of the fault are included respectively in the other two arms of said Wheatstone bridge, a testing instrument in the bridge, a source of current, and means for dividing the total operative resistance into a number of units corresponding to the number of units of length of the faulty conductor, whereby when a balance is indicated by said testing instrument, the number of units of resistance in the ratio-arms indicate directly the distance in units of length from the ends of the cable to the fault.

2. In a fault-locator for electric cables, the combination with a resistance and a corresponding scale divided to indicate the units of resistance, of a movable contact $e$ adapted to be adjusted along said resistance, said movable contact and the other end of the resistance being adapted to be connected respectively with the terminals of the faulty conductor of the cable, said contact $e$ being adapted to be adjusted along the scale to bring into the circuit a number of units of resistence corresponding to the units of length of the cable, a second movable contact $d$ adapted to be adjusted along the operative resistance determined by said contact $e$, a source of current, a testing instrument, and connections forming a Wheatstone-bridge circuit in which the portions of the resistance on either side of the said contact $d$ form two ratio-arms and the portions of the cable-conductor on either side of the fault form the other two arms, the testing instrument being located in the bridge, whereby the position of said contact $d$ when a balance is obtained indicates the location of the fault directly upon the scale.

3. In a fault-locator for electric cables, the combination with a resistance $r$, of a movable contact $e$ adapted to be adjusted along said resistance, said movable contact and the other end of the resistance being adapted to be connected respectively with the terminals of the faulty conductor of the cable, said contact $e$ being adapted to be adjusted along the scale to bring into the circuit a number of units of resistance corresponding to the units of length of the cable, a second movable contact $d$ adapted to be adjusted along the operative resistance determined by said contact $e$, connections forming a Wheatstone-bridge circuit of which the portions of resistance $r$ on either side of contact $d$ form two ratio-arms, the portions of the cable-conductor on either side of the fault forming the other arms, a testing-bridge 6 having two branches, one of said branches containing a galvanometer and the other branch containing a telephone instrument, a telephone-switch adapted to close said branches alternatively, a source of direct current $l'$ and a source of varying current $s^2$ arranged to be connected alternatively in the circuit according to the position of said telephone-switch.

In witness whereof I hereunto subscribe my name this 2d day of July, A. D. 1903.

DANIEL E. WISEMAN.

Witnesses:
 A. G. SIMMER,
 O. R. COLE.